July 31, 1928.
H. J. FOSTER
1,679,302
MILK COOLING DEVICE
Filed Aug. 27, 1926
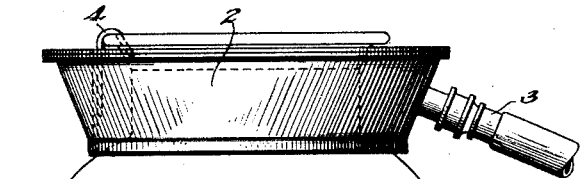
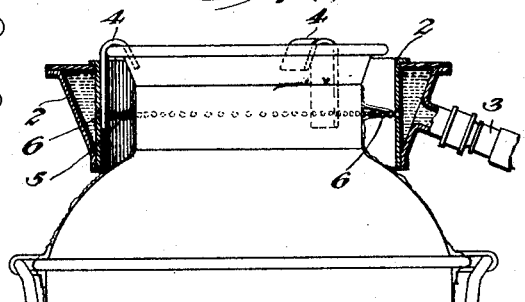
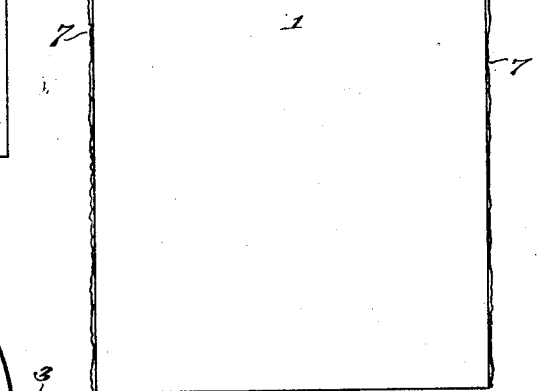
INVENTOR
*Herman J. Foster;*
BY
*Munn & Co.*
ATTORNEYS Patented July 31, 1928.

1,679,302

UNITED STATES PATENT OFFICE.

HERMAN J. FOSTER, OF STOWE, VERMONT.

MILK-COOLING DEVICE.

Application filed August 27, 1926. Serial No. 132,021.

My invention relates to milk coolers, and has particular reference to a device for cooling milk in milk cans, that are used for storage and transporting milk. Its object is to cool the milk by directing a number of fine streams of cold water on to the neck of the can in such a way as to cause the water to form a curtain or film which flows down over the entire surface of the can, thereby cooling the can and in turn the milk within.

Further objects and advantages of my invention will be better understood from the following description thereof, reference being had to the accompanying drawing forming a part hereof, in which:

Figure 1 is a side elevation showing my improvement as in use.

Figure 2 is a top plan view of the device.

Figure 3 is a cross section of the reservoir showing clip by which it is held to the can.

Referring now to these figures my invention resides more particularly in an annular reservoir designated generally by reference numeral 2 adapted to pass over the neck and rest with its lower end adjacent the breast of the conventional milk can designated by the numeral 1.

This reservoir is of generally triangular shape in cross section and has an annular cover or top, with the apex at the lower end adjacent the top of the breast of the can, the inner wall setting off from the neck of the can, is so relatively disposed with respect to the upper end or rim of the neck, as to act as a baffle preventing the spray of water from entering the can, this spray being forced through a circumferential row of perforations 6, which are disposed substantially midway the upper and lower edges of the inner wall of the reservoir 2; through these perforations 6 the cold water from the hose 3 which is attached to the receptacle 2 by a suitable nipple and socket connection, is directed in small needlelike streams or jets 5, against the neck of the can, and flows down over the breast of the can, forming a curtain or film, indicated by the numeral 7, which covers the entire surface of the can and thus producing a chilling of the milk within the can.

The upper edge of the inner wall of the reservoir is turned over outwardly, as shown in the drawing and is also provided with hook shaped lugs or clips 4 to fit over the upper edge or rim of the can to hold the reservoir in the correct position on the can.

The advantages of this device are:—

Milk cans can be used as coolers, thereby saving rehandling of milk and cleaning auxiliary cooling devices.

There is no loss of butter fat on account of some collecting on auxiliary cooling devices. The milk is kept cleaner because it does not have to be rehandled.

The milk can can be kept cool by continuing the flow of water after it has been cooled and cover put on can.

I claim:

1. In a cooler for milk cans having a breast and neck, an annular reservoir for liquid adapted to be supported from the rim of the neck, said reservoir including a straight inner wall and a flaring outer wall, the inner wall of the reservoir having a circumferential row of perforations substantially midway its upper and lower ends, said outer wall provided with a passage through which a cooling liquid may be introduced, said inner wall being spaced from the neck of the can and its lower end positioned adjacent the top of the breast of the can, whereby the liquid will be sprayed over the entire surface of the neck.

2. A milk cooler comprising an annular reservoir including an inner wall and an outer wall through the latter of which water may be introduced, the inner wall provided with a circumferential row of perforations substantially midway its upper and lower edges whereby a continuous spray of water may be directed against and around the neck of a milk can, said inner wall also provided with clips to suspend the reservoir from the rim of the can neck and spaced from the said neck, said inner wall constituting a baffle to prevent entrance of the spray into the milk can.

HERMAN J. FOSTER.